United States Patent
Kraeutler et al.

(10) Patent No.: US 8,960,463 B2
(45) Date of Patent: Feb. 24, 2015

(54) HYDRAULIC BRAKING APPARATUS FOR A CRANE DRIVE AND CRANE

(75) Inventors: Wilhelm Kraeutler, Koblach (AT); Christof Gassner, St. Gerold (AT)

(73) Assignee: Liebherr-Werk Nenzing GmbH, Nenzing (AT)

(*) Notice: Subject to any disclaimer, the term of this patent is extended or adjusted under 35 U.S.C. 154(b) by 476 days.

(21) Appl. No.: 13/431,322

(22) Filed: Mar. 27, 2012

(65) Prior Publication Data

US 2012/0248052 A1    Oct. 4, 2012

(30) Foreign Application Priority Data

Mar. 28, 2011 (DE) .......................... 10 2011 015 286

(51) Int. Cl.
     *B66C 13/06*      (2006.01)
     *B66C 23/86*      (2006.01)

(52) U.S. Cl.
     CPC ...................................... *B66C 23/86* (2013.01)
     USPC .......................................... 212/273; 212/245

(58) Field of Classification Search
     USPC .................. 212/273, 289, 223, 235, 245, 247
     See application file for complete search history.

(56) References Cited

U.S. PATENT DOCUMENTS

| 3,497,269 | A | * | 2/1970 | Van Wicklin, Jr. .......... 303/115.4 |
| 3,840,278 | A | * | 10/1974 | Fleischer et al. .............. 303/168 |
| 5,159,813 | A | * | 11/1992 | Yoshimatsu et al. ............ 60/459 |
| 6,226,586 | B1 | * | 5/2001 | Luckevich et al. .............. 701/70 |
| 8,511,490 | B2 | * | 8/2013 | Kawai et al. ................... 212/235 |
| 2002/0130550 | A1 | * | 9/2002 | Roden et al. ................ 303/113.1 |
| 2010/0264106 | A1 | * | 10/2010 | Kawai et al. ................... 212/276 |
| 2014/0166135 | A1 | * | 6/2014 | Yamashita et al. ....... 137/565.16 |

FOREIGN PATENT DOCUMENTS

| DE | 19625393 | A1 | 1/1998 |
| EP | 2184252 | A1 | 5/2010 |

* cited by examiner

*Primary Examiner* — Emmanuel M Marcelo
(74) *Attorney, Agent, or Firm* — Alleman Hall McCoy Russell & Tuttle LLP

(57) ABSTRACT

The present disclosure relates to a hydraulic braking apparatus for a crane drive for carrying out crane work, in particular a slewing gear, having at least one hydraulic stopping brake for braking the drive movement of the crane drive in an emergency situation, wherein at least one pressure regulation valve is provided for controlling at least one stopping brake to ensure a time-delayed braking torque build-up.

20 Claims, 5 Drawing Sheets

HYDRAULIC BRAKING APPARATUS FOR A CRANE DRIVE AND CRANE

CROSS REFERENCE TO RELATED APPLICATIONS

This application claims priority to German Patent Application No. 10 2011 015 286.5, entitled "Hydraulic Braking Apparatus for a Crane Drive and Crane", filed Mar. 28, 2011, which is hereby incorporated by reference in its entirety for all purposes.

TECHNICAL FIELD

The present disclosure relates to a hydraulic braking apparatus for a crane drive for carrying out crane work, in particular a slewing gear, having at least one hydraulic stopping brake for braking the drive movement of the crane drive in an emergency situation.

BACKGROUND AND SUMMARY

The structure of known crane systems is frequently divided into an undercarriage and a superstructure. Both components are coupled to one another via a slewing gear for rotational movements of the superstructure relative to the undercarriage. The slewing gear includes one or more drive motors for producing a rotational movement which is hydraulically braked as required in normal operation via the installed drive.

In emergency situations, the hydraulic drive is deactivated, for example by means of a complete rotation, and the rotational movement is stopped by one or more stopping brakes installed at the slewing gear. In emergency situations, the stopping brakes enable the introduction of the required braking torque to the slewing gear to achieve an interruption of the rotational movement as quickly as possible.

In the currently used braking systems for slewing gears, it is, however, the case that on the actuation of an emergency signal, the corresponding braking torque begins abruptly and the rotational movement of the slewing gear is stopped sharply. Since the superstructure as a rule has a solid and sluggish crane structure, substantial damage to the crane mechanism can occur on an abrupt stopping of the rotational movement.

A possible solution approach is shown in DE 10 2008 056 022 B3 which proposes a crane slewing gear having a plurality of independently actuable stopping brakes. In the case of an emergency stop event having occurred, the brakes are actuated sequentially in time, which allows a moderated braking of the slewing gear. It is, however, disadvantageous in this solution that a slewing gear having a plurality of stopping brakes is a required for its implementation. The solution approach shown is, in contrast, not usable for crane slewing gears having only one stopping brake.

It is the object of the present disclosure to provide a hydraulic braking apparatus for a crane drive which overcomes the problems explained above.

This object is achieved by a hydraulic braking apparatus for a crane drive for carrying out crane work having a braking apparatus. The braking apparatus accordingly includes at least one hydraulic stopping brake for braking the drive movement of the crane drive in an emergency situation. The crane drive may in particular be a slewing gear. In this case, the rotational movement of the slewing gear may be braked by the braking apparatus in accordance with the present disclosure.

The embodiment is, however, not restricted to a slewing gear. The use of the braking apparatus in accordance with the present disclosure is generally conceivable in any type of crane drives for carrying out the crane work. This includes inter alia a hoisting gear or also a retracting mechanism.

In accordance with the present disclosure, at least one stopping brake is controlled via at least one provided pressure regulation valve to ensure a time-delayed braking torque build-up.

The principle in accordance with the present disclosure applies equally to stopping brakes which achieve a braking effect due to a pressure build-up or pressure drop. The advantage of the present disclosure which is material to the present disclosure comprises the fact that the pressure variation takes place in a regulated manner over time in the supply pressure of the stopping brake due to the pressure regulation valve used and therefore takes place with any desired time delay. The engaging braking torque of the stopping brake consequently does not start immediately, but is rather built up over a definable time period. As a rule, however, use is made of stopping brakes which achieve a braking effect due to a pressure drop since a pressure loss can particularly be assumed in emergency situations.

In contrast to this, the control of such stopping brakes takes place as a rule in crane drives known from the prior art directly via a ski selector valve which either abruptly stops or immediately switches through the supply pressure to the stopping brake. The maximum possible braking torque is accordingly applied almost without delay.

At least one pressure regulation valve is controlled via at least one control pressure line to control the pass-through volume of the supply pressure line to the stopping brake. The control pressure line is preferably coupled via at least one ski selector valve to the supply pressure line of the stopping brake. In this case, the pressure valve is designed as a directly controlled pressure regulation valve. The use of an electrically controllable 4/2 ski selector valve is expedient. In the normal case, the control pressure line of the pressure regulation valve is connected to the supply pressure line; the control pressure then corresponds to the pressure level of the supply pressure line. The actuation of the ski selector valve, for example to trigger an emergency stop, effects a switching through of the control pressure line to a return tank.

Alternatively, the pressure regulation valve can be designed as a precontrolled pressure valve. In this case, the control pressure line of the pressure regulation valve is coupled to the backflow outlet of the pressure regulation valve.

It can be expedient for safety reasons that at least one pressure store is arranged in the supply pressure line of the stopping brake. For example, a complete pressure failure in the supply pressure line can occur due to a hydraulic defect. The arranged energy store can compensate the abrupt pressure drop at least at times in order nevertheless to be able to ensure a braking torque building up with a time delay. The pressure store is preferably designed as a bubble storage. Alternative embodiments are nevertheless conceivable.

To delay the pressure drop within the control pressure line of the pressure regulation valve in time, it can be expedient that at least one energy store is connected or connectable to the control pressure line. The pressure drop in the control pressure line is triggered via a corresponding switch position of the ski selector valve. The immediate pressure drop can be compensated over a specific time period via the stored pressure volume of the energy store to delay the pressure drop of the control pressure in time.

At least one used stopping brake of the crane drive can be designed as a multi-disk brake, as a band brake or as a disk brake. The basic principle material to the present disclosure of the present disclosure is in this respect independent of the present embodiment of the stopping brake used.

The stopping brake expediently engages at the output of at least one drive motor of the crane drive.

The present disclosure furthermore relates to a crane having at least one crane drive for carrying out the crane work, with the crane including in accordance with the present disclosure at least one hydraulic braking apparatus in accordance with one of the above-explained embodiments. The crane evidently accordingly has the same advantages and properties as the claimed hydraulic braking apparatus in accordance with the present disclosure so that a repeated explanation is dispensed with at this point.

The crane has a slewing gear and/or a hoisting gear and/or a retraction mechanism which is/are equipped with corresponding drives and likewise have more than one hydraulic braking apparatus.

Further advantages and details of the present disclosure will be explained in more detail in the following with reference to the drawings.

DETAILED DESCRIPTION

Figure 1:
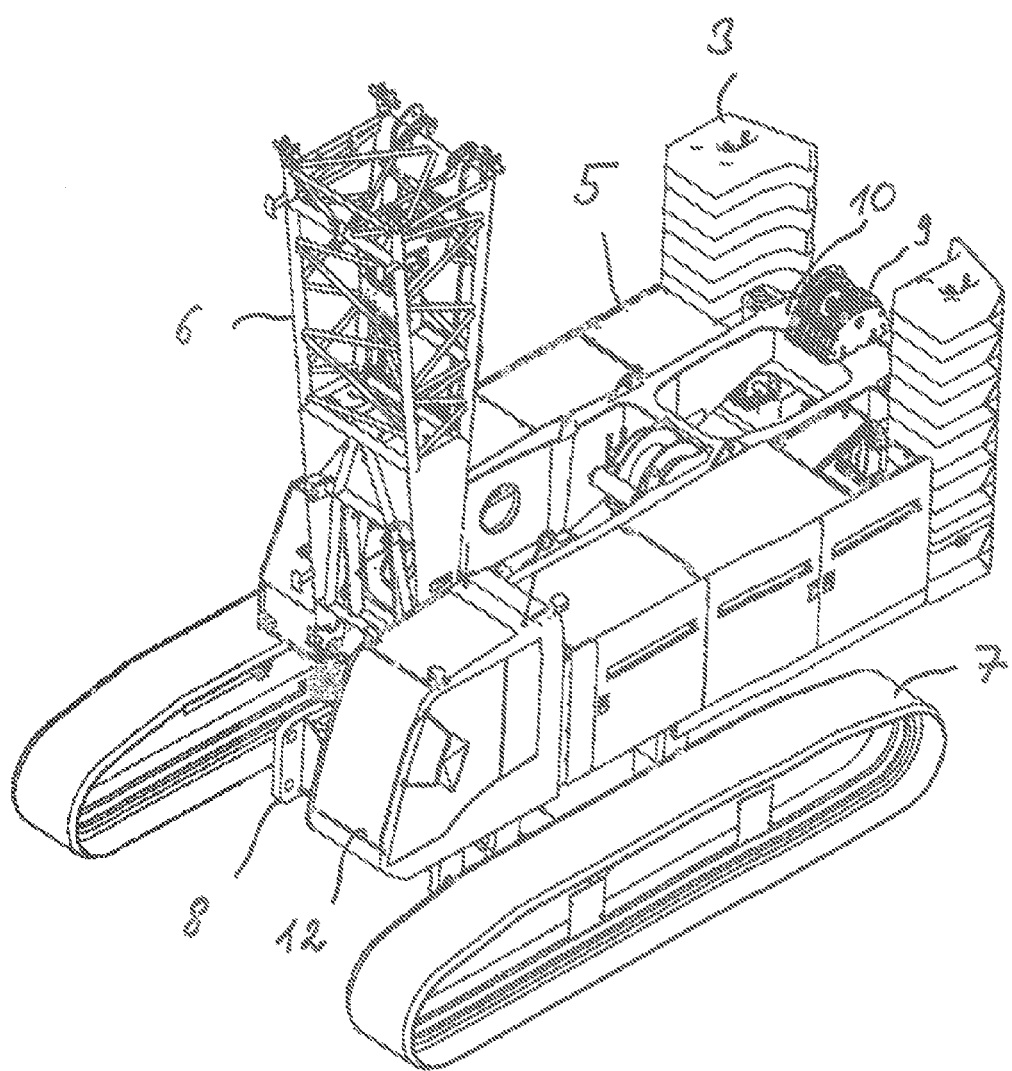
FIG. 1 shows a perspective view of the crane in accordance with the present disclosure with a hydraulic braking apparatus in accordance with the present disclosure.

A possible embodiment of the crane in accordance with the present disclosure is shown in FIG. 1. In this respect, it is a case of a crawler-mounted crane having a boom 6 which is pivotally connected to the superstructure 5 and having an undercarriage 8 which has a crawler assembly 7. The superstructure 5 of the crawler-mounted crane is in this respect rotatably supported on the undercarriage 8 via a slewing gear 20. As a counterweight to the boom 6 and to the load to be lifted by the crawler-mounted crane in accordance with the present disclosure, ballast elements 3 in the form of ballast plates are arranged at the superstructure 5.

The supporting weld construction of the superstructure 5 is the revolving deck 10. The revolving deck 10 serves as an erector frame for the boom 6 as well as for receiving the individual assemblies for the main function of the crane. In the embodiment of FIG. 1, the hoisting gear, the retraction mechanism 9, the slewing gear 20, the luffing mechanism, a crane cabin 12 and the boom system 6 are installed on the superstructure 5, i.e. at the revolving deck 10.

Figure 2:
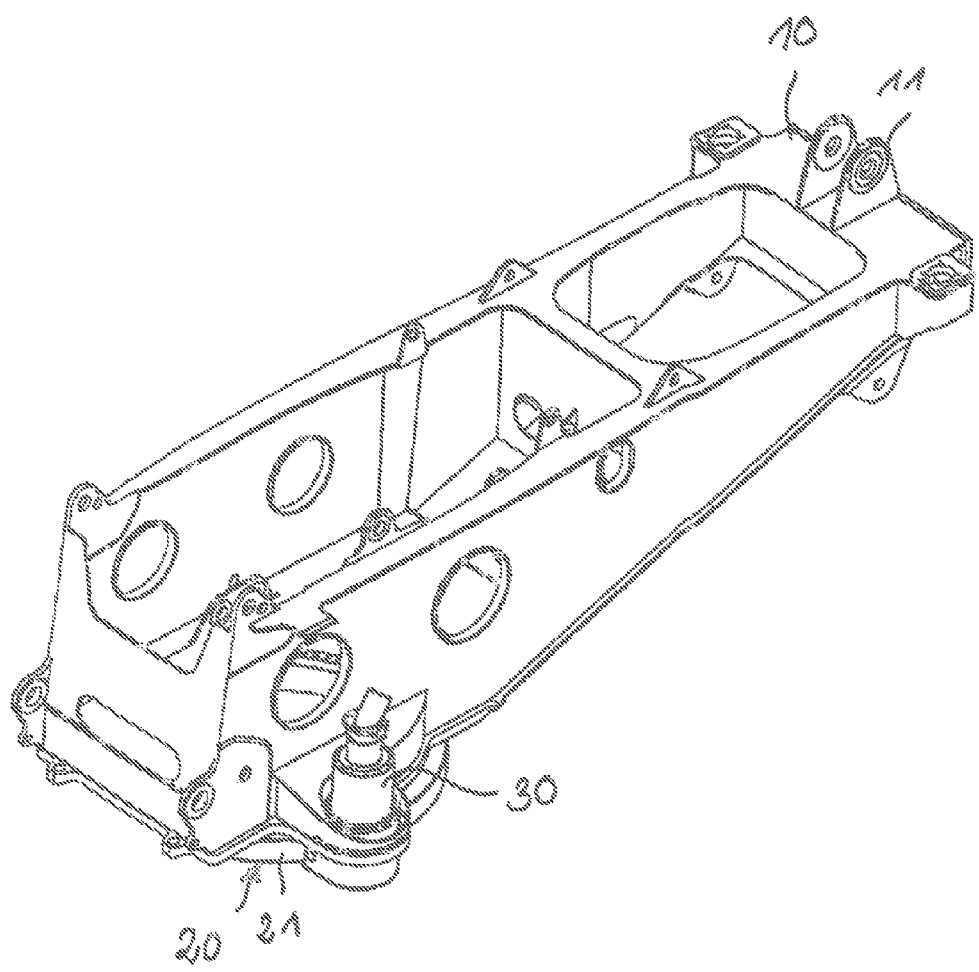
FIG. 2 shows a perspective detailed view of the revolving deck in accordance with FIG. 1.

A detailed representation of the revolving deck 10 can be seen from the perspective view of FIG. 2. The winch frame 11 for receiving the retraction mechanism 9 as well as corresponding apparatus for receiving the ballast plates 3 are arranged at the rear end of the revolving deck 10. Suitable bolting points for the pivotal fastening of the boom system 6 are located at the front end.

Furthermore, a part of the slewing gear 20 for the rotatable support of the superstructure 5 on the undercarriage 8 is arranged at the front end of the revolving deck 10.

The slewing gear drive 30 is seated at the outer periphery of the roller cage 21 of the slewing gear 20 and generates a relative rotational movement of the superstructure 5 with respect to the undercarriage 8 in both directions. The drive motor used is based, for example, on an axial piston motor at whose output shaft an installed spring-applied multi-disk brake 50 engages and brings about a definable braking torque for braking the rotational movement as required, i.e. in an emergency situation.

On an emergency stop event, the rotational movement of the superstructure 5 and thus of the boom system 6 should be stopped as quickly as possible to be able to defuse the danger sources arising from the pivoting crane structure, in particular the boom system 6 as quickly as possible. Too abrupt a braking of the rotational movement of the superstructure 5 can, however, under certain circumstances result in enormous damage to the individual crane components, in particular to the boom system 6, due to the mass and inertia of the installed crane structure. For this reason, the present disclosure proposes the use of the hydraulic braking apparatus in accordance with one of the embodiments shown in FIGS. 3, 4.

Figure 3:
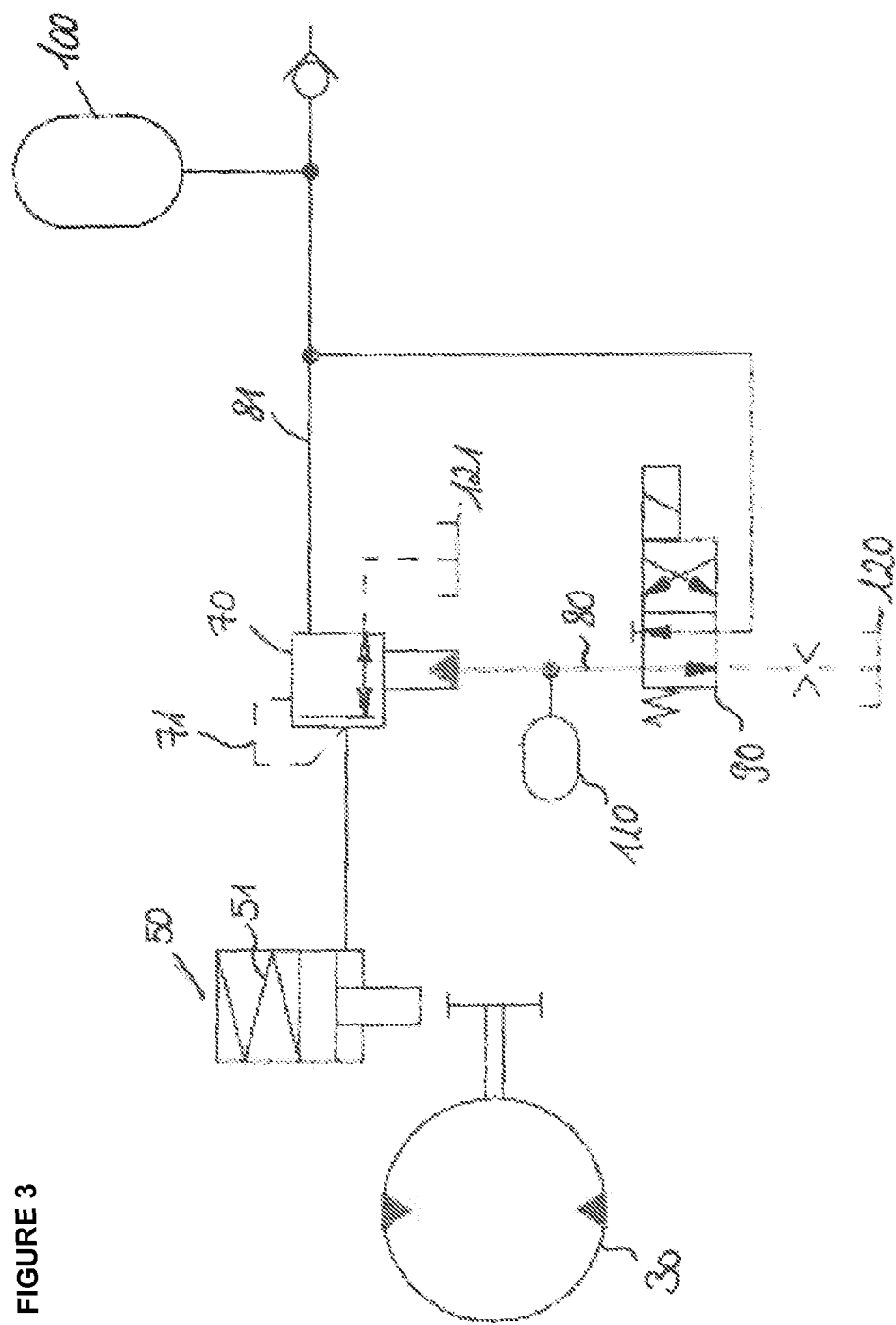
FIG. 3 shows a hydraulic schematic diagram of the hydraulic braking apparatus in accordance with the present disclosure in accordance with a first embodiment.

FIG. 3 shows a schematic hydraulic diagram for the control of a spring-applied multi-disk brake 50 which applies a braking torque to the output of the slewing gear drive 30.

The spring-applied multi-disk brake 50 is fed with the required supply pressure via the supply pressure line 81 so that the brake disks of the spring.-applied multi-disk brake 50 act against the integrated spring 51 and are not in engagement with the output of the slewing gear drive 30. The supply pressure line 81 is connected to the spring-applied multi-disk brake 50 via the pressure regulation valve 70.

The embodiment of FIG. 3 shows a directly controlled pressure regulation valve 70. The control pressure line 80 of the pressure regulation valve 70 is coupled to the supply pressure line 81 via a 4/2 ski selector valve. The electrically controllable ski selector valve 90 serves the triggering of an emergency stop event. Since the spring-applied multi-disk brake 50 also serves the fixing of the slewing gear at a standstill, the activation of the fixing function likewise takes place via the ski selector valve 90.

In the normal state, the ski selector valve 90 connects the supply pressure line 81 to the control pressure line 80 of the pressure regulation valve 70. Accordingly a control pressure having the pressure level of the supply pressure line 81 is applied to the pressure regulation valve 70. The output pressure level of the pressure regulation valve 70, which is applied to the multi-disk brake 50, accordingly corresponds to the pressure level of the supply pressure line 81. A continuous adaptation of the output pressure level to the applied control pressure of the control pressure line 80 takes place via the feedback 71.

In the representation of FIG. 3, the ski selector valve 90 is switched into the emergency stop position so that the hydraulic medium within the control pressure line 80 flows back via the ski selector valve 90 into the hydraulic tank 120. The falling control pressure effects a pressure drop at the output connected to the multi-disk brake 50. The pressure compensation takes place via the backflow outlet of the pressure regulation valve 70 which opens into the hydraulic tank 121. The pressure drop at the multi-disk brake 50 is oriented at the pressure level present within the control pressure line 80. To delay the drop in time, the energy store 110 is coupled to the control pressure line 80.

A possible total failure of the supply pressure of the supply pressure line 81 can be compensated time-wise via the energy store 100 which is connected to the supply pressure line 81. A complete pressure loss is based as a rule on a substantial defect in the hydraulic supply system. Leaks, a power failure with a pump standstill or other types of defects can be named as examples. The immediate pressure loss in the supply pressure line 81 can be delayed in time due to the energy store 100 in order also to be able to ensure a braking torque of the multi-disk brake 50 starting with a time delay.

Figure 4:
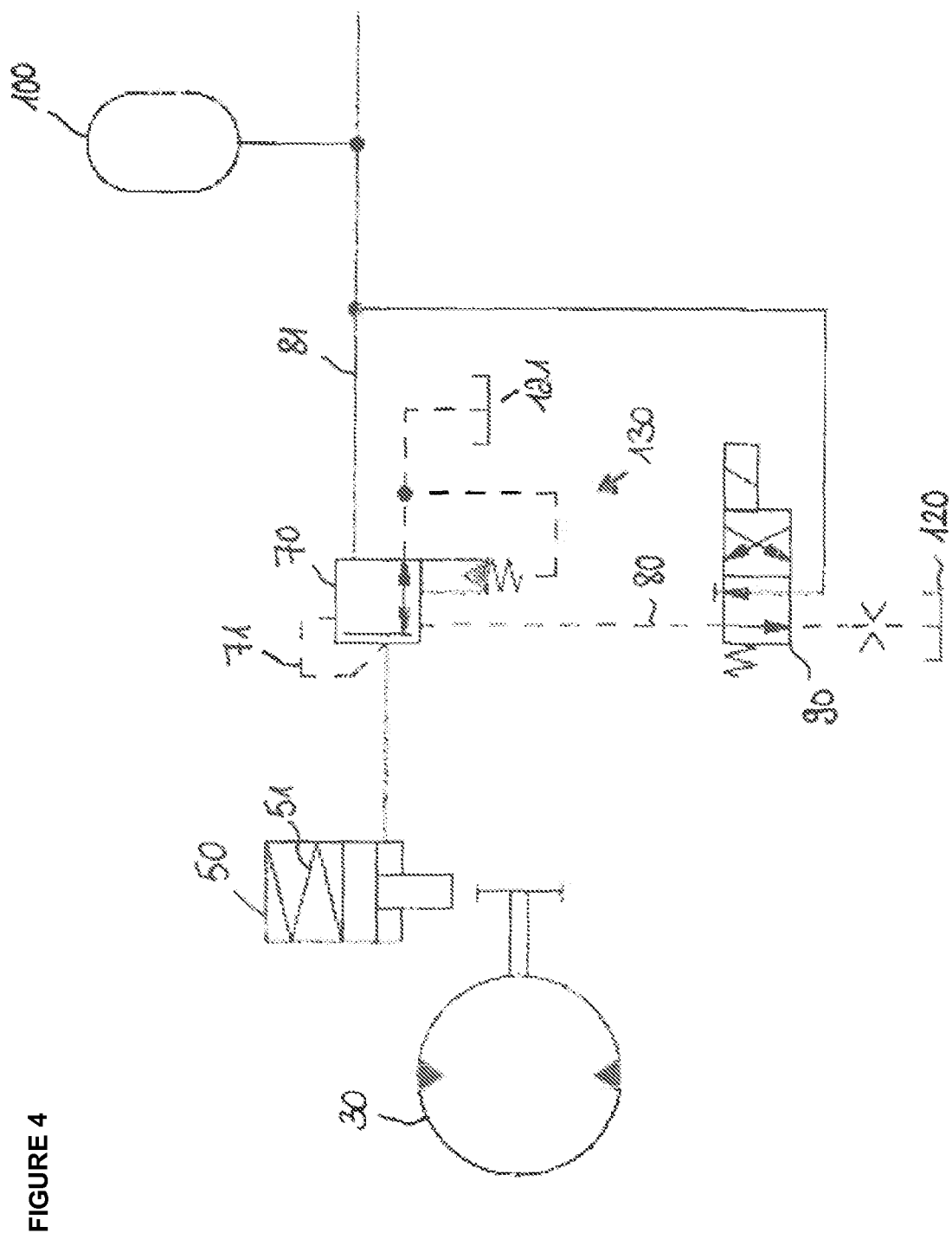
FIG. 4 shows a further hydraulic schematic diagram of the hydraulic braking apparatus in accordance with the present disclosure in accordance with a second embodiment variant.

An alternative embodiment of the braking apparatus in accordance with the present disclosure can be seen from FIG. 4. In this embodiment, the pressure regulation valve 70 is, in contrast to the embodiment of FIG. 3, not controlled directly, but rather via the precontrol 130. The backflow outlet of the pressure regulation valve 70 is coupled to the control inlet in this respect. A time delay of the pressure drop is hereby effected in the control line 80. The optional energy store 110 of FIG. 3 is consequently superfluous. The remaining components of the hydraulic braking apparatus of FIG. 4 correspond to the embodiment in accordance with FIG. 3 and are therefore designated by identical reference numerals. A repeated explanation of the components present is therefore no longer necessary at this point.

Figure 5:
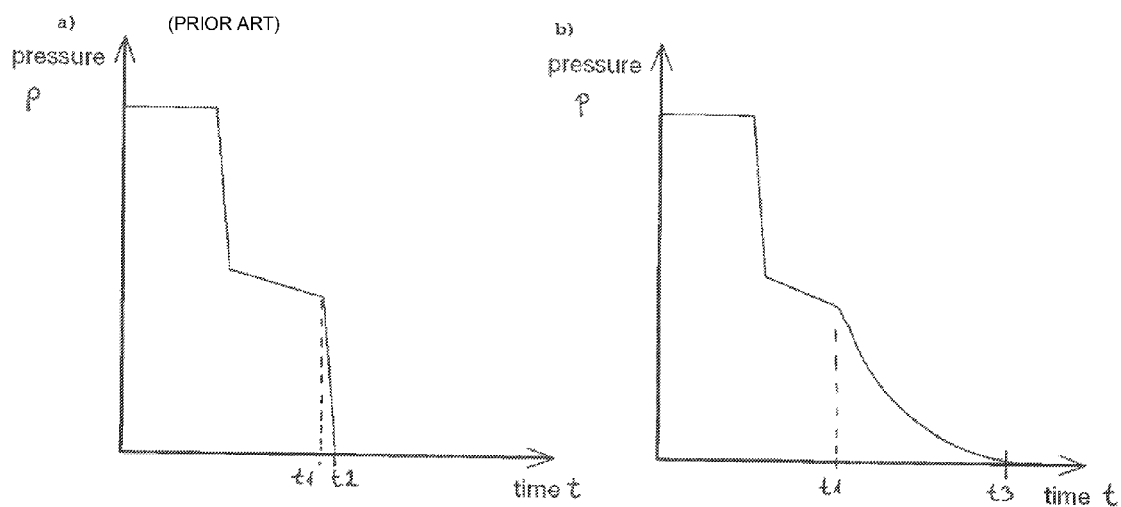
FIG. 5 shows representations of the hydraulic development at the stopping brake of a conventional braking apparatus and at the stopping brake of the braking apparatus in accordance with the present disclosure.

FIG. 5 shows two different time diagrams which characterize the pressure drop p at the spring-applied multi-disk brake 30 over time t during the braking process. FIG. 5a corresponds to the time development of the pressure drop p which is adopted with a conventional control known from the prior art of a multi-disk brake by means of a ski selector valve.

In contrast, the time diagram 5b shows the time development of the pressure drop p at a multi-disk brake 50 using the braking apparatus in accordance with the present disclosure. The points in time t2 or t3 in this respect mark the moment of complete pressure loss at the multi-disk brake 50 and consequently the maximum braking torque applied to the slewing gear of the crane. The time interval t1-t2 from the point in time t1 to the moment of complete pressure loss in FIG. 5a represents the building up of the braking torque and is very short on a use of the braking apparatus known from the prior art, whereas a much longer time interval t1-t3 (FIG. 5b) up to the maximum braking torque is provided by the braking apparatus in accordance with the present disclosure. The advantageous delay in the braking torque being built up avoids damage to the crane structure on too abrupt an interruption of the rotational movement of the superstructure 8, with a sufficiently fast braking of the rotational movement still being ensured in emergency situations.

In another example, a method is provided for controlling hydraulic braking apparatus for a crane drive for carrying out crane work, in particular a slewing gear as described herein. The method may include rotating a crane superstructure relative to an undercarriage of the crane via a crane drive, such as a slewing gear drive including one or more drive motors for producing rotational movement. The method may also include hydraulically braking, during normal operation of the crane, the superstructure relative to the undercarriage via the slewing gear drive. During an emergency situation, the method further includes deactivating the slewing gear drive by a complete rotation of the undercarriage relative to the superstructure. In this case, the rotational movement is not stopped as quickly as possible, but rather gradually over time by pressure variation of hydraulic supply pressure of a sole stopping brake being regulated over a definable time period to provide a time-delayed braking torque build. In this way, damage to the crane may be reduced, while still providing proper operating during the emergency situation.

The invention claimed is:

1. A hydraulic braking apparatus for a crane drive for carrying out crane work comprising at least one hydraulic stopping brake for braking drive movement of the crane drive in an emergency situation, wherein at least one pressure regulation valve is provided for controlling the hydraulic stopping brake to ensure a time-delayed braking torque build-up.

2. The hydraulic braking apparatus in accordance with claim 1, wherein a control pressure line of the at least one pressure regulation valve is coupled to a supply pressure line of the hydraulic stopping brake via at least one ski selector valve.

3. The hydraulic braking apparatus in accordance with claim 2, wherein at least one pressure store is provided in the supply pressure line of the hydraulic stopping brake to compensate a total pressure drop.

4. The hydraulic braking apparatus in accordance with claim 3, wherein the at least one pressure store is arranged in the control pressure line of the pressure regulation valve.

5. The hydraulic braking apparatus in accordance with claim 1, wherein the at least one pressure regulation valve is a directly controlled pressure regulation valve.

6. The hydraulic braking apparatus in accordance with claim 1, wherein the at least one pressure regulation valve is a precontrolled pressure regulation valve.

7. The hydraulic braking apparatus in accordance with claim 1, wherein the hydraulic stopping brake is a multi-disk brake.

8. The hydraulic braking apparatus in accordance with claim 1, wherein the hydraulic stopping brake is a band brake.

9. The hydraulic braking apparatus in accordance with claim 1, wherein the crane drive is a slewing gear drive, and wherein the hydraulic stopping brake engages at at least one output of the slewing gear drive.

10. The hydraulic braking apparatus in accordance with claim 1, wherein the crane drive is a slewing gear drive rotatably coupling a superstructure to an undercarriage of a crane, the slewing gear including one or more drive motors for producing rotational movement which is hydraulically braked in normal operation via the slewing gear drive, wherein the hydraulic drive is deactivated during the emergency situation by a complete rotation of the undercarriage relative to the superstructure, and wherein the rotational movement is not stopped as quickly as possible but rather where pressure variation of the hydraulic supply pressure of the stopping brake pressure is regulated over a definable time period to provide a time-delayed braking torque build-up.

11. A crane comprising a crane drive for carrying out crane work, wherein the crane includes at least one hydraulic braking apparatus for braking drive movement, wherein at least one pressure regulation valve is provided for controlling at least one hydraulic stopping brake of the hydraulic braking apparatus to ensure a time-delayed braking torque build-up.

12. The crane in accordance with claim 11, wherein the crane drive comprises a slewing gear.

13. A hydraulic braking apparatus for a crane drive for carrying out crane work, comprising:
 a single hydraulic stopping brake for braking drive movement of the crane drive in an emergency situation; and
 at least one pressure regulation valve coupled to the single hydraulic stopping brake for varying supply pressure to the stopping brake in a regulated manner over time to ensure a time-delayed braking torque build-up.

14. The hydraulic braking apparatus in accordance with claim 13, wherein the stopping brake achieves a braking effect due to a pressure.

15. The hydraulic braking apparatus in accordance with claim 13, wherein a control pressure line of the at least one pressure regulation valve is coupled to a supply pressure line of the hydraulic stopping brake via at least one ski selector valve.

16. The hydraulic braking apparatus in accordance with claim 13, wherein the at least one pressure regulation valve is a directly controlled pressure regulation valve.

17. The hydraulic braking apparatus in accordance with claim 13, wherein the at least one pressure regulation valve is a precontrolled pressure regulation valve.

18. The hydraulic braking apparatus in accordance with claim 13, wherein the hydraulic stopping brake is a multi-disk brake.

19. The hydraulic braking apparatus in accordance with claim 13, wherein the hydraulic stopping brake is a band brake.

20. The hydraulic braking apparatus in accordance with claim 13, wherein the crane drive is a slewing gear drive, and wherein at least one stopping brake engages at at least one output of the slewing gear drive.

* * * * *